United States Patent [19]
Mergenthaler et al.

[11] Patent Number: 4,851,667
[45] Date of Patent: Jul. 25, 1989

[54] COMPACT LASER SCANNER OPTICAL SYSTEM

[75] Inventors: Barry M. Mergenthaler, Cambridge; Paul O. Detwiler, New Concord; Donald A. Collins, Jr., Cambridge, all of Ohio

[73] Assignee: NCR Corporation, Dayton, Ohio

[21] Appl. No.: 121,371

[22] Filed: Nov. 16, 1987

[51] Int. Cl.⁴ .......................... H01J 3/14; H01J 5/16; H01J 40/14
[52] U.S. Cl. ..................................... 250/236; 250/568
[58] Field of Search ............... 250/566, 568, 570, 234, 250/236; 235/462, 467, 470

[56] References Cited

U.S. PATENT DOCUMENTS

| 4,097,729 | 6/1978 | Seligman et al. | 250/568 |
| 4,710,615 | 12/1987 | Meyers | 235/454 |
| 4,713,532 | 12/1987 | Knowles | 235/470 |

FOREIGN PATENT DOCUMENTS

| 0042946 | 1/1982 | European Pat. Off. . |
| 0244996 | 6/1987 | European Pat. Off. . |
| 0122126 | 3/1988 | European Pat. Off. . |
| 2308116 | 11/1976 | France . |

Primary Examiner—David C. Nelms
Assistant Examiner—Eric F. Chatman
Attorney, Agent, or Firm—Wilbert Hawk, Jr.; Albert L. Sessler, Jr.; Richard W. Lavin

[57] ABSTRACT

A compact optical scanning system comprises a portable enclosure structure having a cover portion which includes a glass enclosed aperture over which a UPC label attached to a purchased merchandise item is moved. Mounted within the enclosure is a laser whose output coherent light beam is reflected along a path extending in a direction parallel to the cover portion by mirrors and a bifocal lens member mounted on a shelf extending between opposite sidewalls of enclosure. One of the mirrors mounted on the shelf reflects the laser beam in a downward direction at a rotating multifaceted mirrored member mounted on and directly beneath the shelf and the bifocal lens. The rotating mirrored spinner directs the laser beam at a plurality of pattern mirrors which redirects the received laser beam towards the aperture, forming a scan pattern thereat for scanning the UPC label.

10 Claims, 4 Drawing Sheets

COMPACT LASER SCANNER OPTICAL SYSTEM

CROSS-REFERENCE TO RELATED APPLICATIONS

Compact Optical Scanner, co-pending application, Ser. No. 60586, filed on June 11, 1987, invented by Ronald A. Ferrante and assigned to the NCR Corporation.

BACKGROUND OF THE INVENTION

The present invention relates to optical scanning systems and more particularly to a compact portable optical bar code scanner system which can be mounted in or on a checkout counter in which the checkout operator is in a sitting position with respect to the checkout counter.

In present-day merchandising point-of-sale operations, data pertaining to the purchase of a merchandise item is obtained by reading data encoded indicia such as a bar code printed on the merchandise item. In order to standardize the bar codes used in various point-of-sale readout systems, the grocery industry has adopted a uniform product code (UPC) which is in the form of a bar code. Reading systems which have been constructed to read this bar code include hand-held wands which are moved across a label bearing the bar code and stationary optical scanners normally located within the cabinet structure of a checkout counter and in which the bar code label is read when a purchased merchandise item and its associated label aremmoved across a window in the supporting surface of the counter constituting the scanning area of a counter, which movement is part of the process of loading the item in a bag or baggage cart. There has arisen a need for a stationary optical scanner to be installed in a checkout counter in which the operator is required to be in a sitting position at the checkout counter having a table-height construction. In order to meet this requirement, the depth of the optical scanner is required to be very shallow which limits the length of travel of the scanning light beams generated by the optical scanner and therefore the number of scanning lines in the resulting scanning pattern projected to read the bar code label which in turn controls the scanning efficiency of the pattern and the scanner. In the above cited co-pending patent application, a compact optical scanner was constructed to satisfy the above cited requirements. While the compact scanner read coded labels positioned adjacent the scanner at any angle up to 90° to the reading surface of the scanner, the reading performance of the scan pattern for coded labels flush to the surface of the scanner was not optimum because of the low projection angle towards the ends of the diagonal scan lines in the scan pattern which resulted in excessive elongation of the laser beam diameter when the coded label was relatively flush thereto.

SUMMARY OF THE INVENTION

A compact optical scanner is provided which comprises a portable enclosure structure having a cover portion which includes a glass enclosed aperture over which a UPC label attached to a purchased merchandise item is moved. Mounted within the enclosure below the cover portion and extending in a direction parallel with the surface of the cover portion is a laser whose output light beam is deflected along a path extending in a direction parallel to the cover portion by mirrors mounted on a shelf extending between opposite side walls of the enclosure. The laser beam is directed through an aperture in a collection mirror to a bifocal lens which directs the laser beam at a mirror mounted so as to direct the laser beam at a six-sided multifaceted rotating mirrored spinner mounted to the floor of the enclosure directly beneath the shelf and the bifocal lens. Each set of opposite sided mirrors on the spinner are orientated at a different angle to a vertical plane thus producing six distinct scanning beams. The rotating mirrored spinner directs the laser beams at a plurality of pattern mirrors which redirect the received scanning light beams towards the aperture forming a scan pattern thereat including two sets of horizontal scan lines, a cross hatch pattern of four sets of scan lines and two sets of scan lines orientated at 60° to the horizontal sets of scan lines for scanning the UPC label. The reflected light beams from the label are retro-directed via the pattern mirrors, the rotating mirrors, the deflecting mirror, and the bifocal lens to one side of the collection mirror which is constructed to reflect light having a wavelength equal to or less than the light of the laser beam to a colored meniscus lens. The color of the meniscus lens is chosen to filter out wavelengths of light which are less than that of the laser light beam resulting in the transmission of reflected light beams having a band pass centered on the laser wavelength. A photodetector positioned behind the meniscus lens converts the received light beams to electrical signals which are processed by the scanner electronics.

It is therefore a principal object of this invention to provide a compact optical scanner which can be placed on or in the supporting structure of a checkout counter for reading bar code labels on merchandise items which are orientated up to 90° to the reading surface of the scanner and which are moved past the scanner by an operator who is sitting down at the checkout counter.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Figure 1:
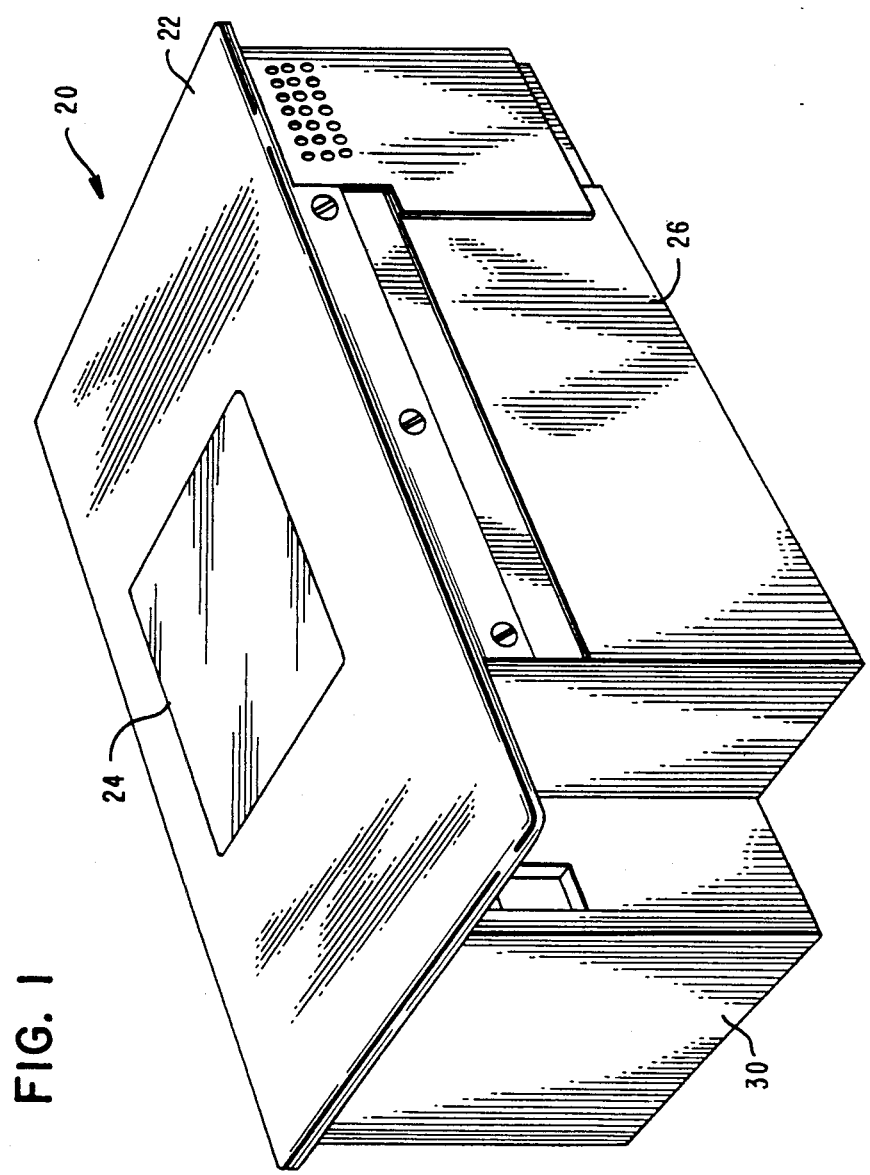
FIG. 1 is a perspective view of the compact optical scanner of the present invention.

Referring now to FIG. 1 there is shown a perspective view of the compact optical scanner of the present invention which comprises a box-like structure generally indicated by the numeral 20 and which includes a cover portion 22 having centrally located therein a glass covered aperture 24. The structure 20 further includes a pair of sidewall portions 26 and 28 (FIG. 2) and front and rear wall portions 30 and 32 (FIG. 2) having a maximum depth of 13 cm. The structure 20 is normally mounted within a checkout counter (not shown) whose supporting surface is coplanar with the surface of the cover portion 22 enabling a purchased merchandise item having a UPC coded label attached thereto to be moved past the aperture 24 as part of a checkout operation.

Figure 2:
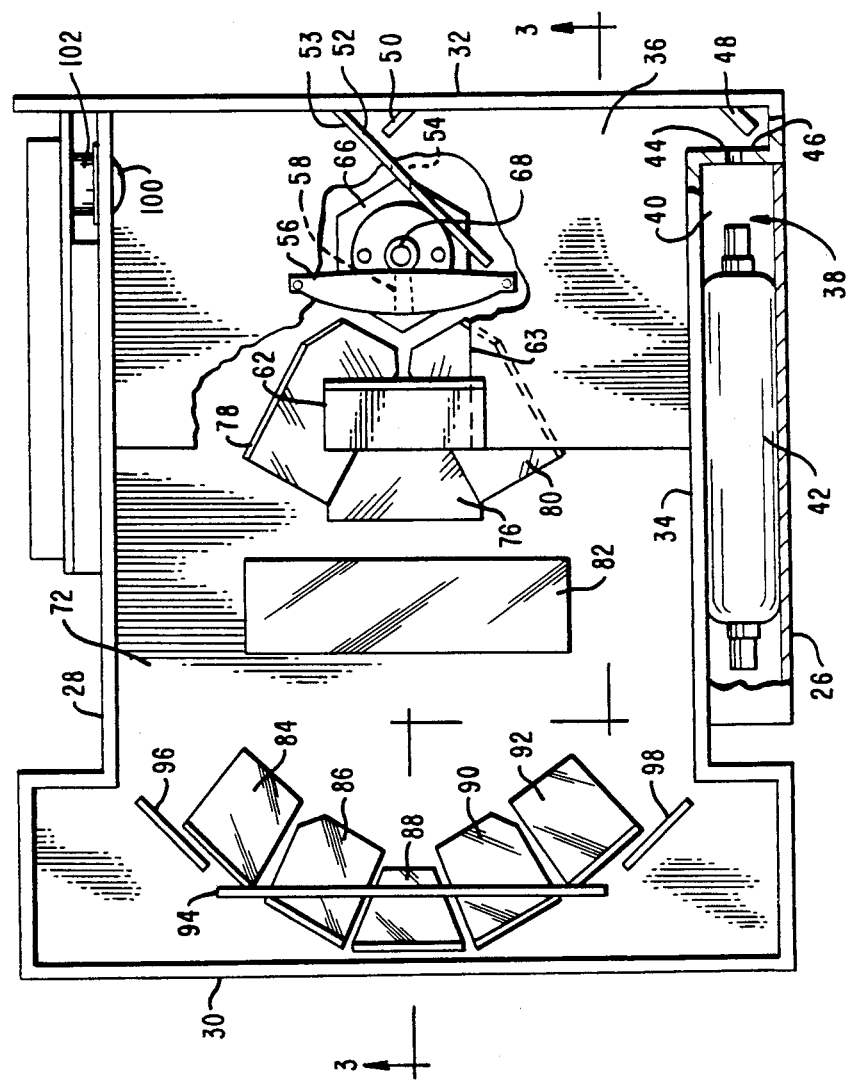
FIG. 2 is a top view of the compact scanner with the cover and a portion of the shelf removed showing the location of the rotating mirrored spinner member.
Figure 3:
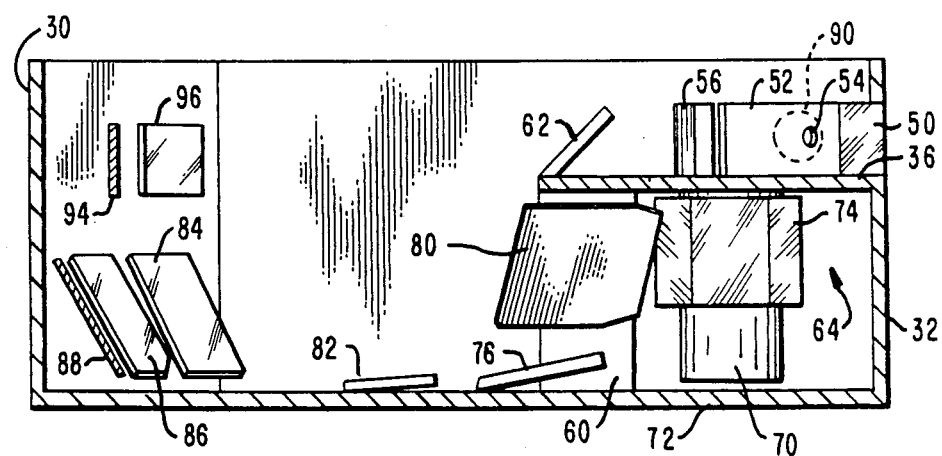
FIG. 3 is a sectional view taken on line 3—3 of FIG. 2.

Referring now to FIGS. 2 and 3, there are shown structural details of the optical scanner. Extending between the sidewall portion 28 and an inner sidewall portion 34 is a shelf member 36. The inner sidewall portion 34 and the sidewall portion 26 form a compartment generally indicated by the numeral 38 in which is located a laser member 42 secured to the sidewall portion 34 which projects a coherent light beam 43 (FIG. 4) through an aperture 44 located in a rear wall portion 46 of the compartment 38. Positioned adjacent the aperture 44 and mounted on the shelf member 36 is a routing mirror 48 positioned at a 45° angle to the centerline of the aperture 44. Also mounted on the shelf member 36 is a second routing mirror 50 positioned at a 45° angle to the rear wall portion 32.

Mounted on the shelf member 36 adjacent the routing mirror 50 and extending in a direction perpendicular to the orientation of the routing mirror 50 is a transparent collection mirror 52 which includes an aperture 54 extending through the mirror 52. The mirror 52 has one side 53 constructed to reflect light impinging thereon in a manner that is well known in the art. Mounted on the shelf member 36 and adjacent the collection mirror 52 is a bifocal lens member 56 which includes a lenslet portion 58. The bifocal lens member 56 is constructed to focus the light reflected from a scanned UPC coded label onto a photodetector 102 (FIGS. 2 and 4) while the lenslet portion 58 is constructed to focus the laser beam 43 (FIG. 4) onto the UPC coded label positions adjacent the aperture 24.

Mounted at an angle of 65° to the shelf member 36, is a routing mirror 62 (FIG. 3). As will be described hereinafter, the routing mirrors 48 and 50 will direct the output light beam of the laser member 42 through the aperture 54 in the collection mirror 52 and the lenslet portion 58 in the bifocal lens 56 to the routing mirror 62 which directs the light beam in a downwardly direction through recessed portion 63 in the shelf member 36 to a position beneath the shelf member 36 and the bifocal lens 56 where the beam impinges on a multifaceted mirrored spinner generally indicated by the numeral 64. The spinner 64 comprises a support member 66 (FIG. 2) secured to a drive shaft 68 which in turn is rotatably mounted between the shelf member 36 and a drive motor 70 secured to the shelf member 36 of the enclosure structure 20 for rotating the spinner 64 at a predetermined speed, for example, 6144 revolutions per minute. Secured to the support member 66 are six mirror elements 74 (FIG. 3) in which opposite sided mirrors are mounted at various angles to the vertical face of the support member in order to generate a multiple line scanning pattern as will be described more fully hereinafter. Two of the mirrors are pitched backward by 8° to a vertical plane. One of the remaining two sets of mirrors 74 are pitched forward by 3°, while the remaining set of two mirrors are pitched backward by 3°.

Figure 5:
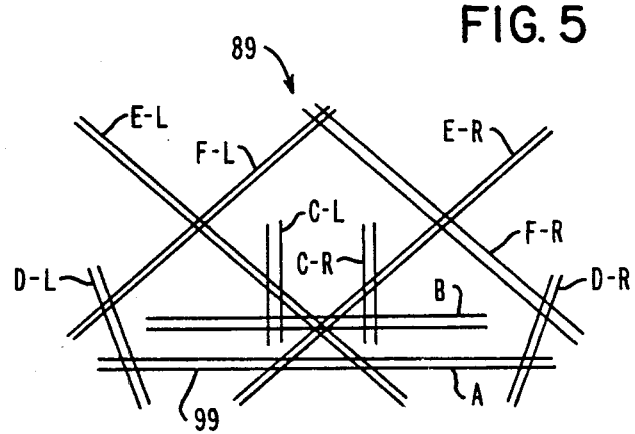
FIG. 5 is a plan view of the scan pattern generated by the optical geometry of the present invention.

Mounted at an angle to the floor portion 72 is a center lower pattern mirror 76 while secured to brackets 60 (FIG. 3) mounted on the floor portion 72 are a right lower pattern mirror 78 and a left lower pattern mirror 80 (FIGS. 2 and 3). Mounted at a slight angle to the floor portion 72 is a center upper pattern mirror 82. Located adjacent the front wall portion 30 of the structure 20 and mounted at an angle of 72° to the floor portion 72 are a right end lower pattern mirror 84 and a left end lower pattern mirror 92. Mounted at an angle of 71° to the floor portion 72 is a right middle lower pattern mirror 86 and a left middle lower pattern mirror 90. Mounted at an angle of 65° to the floor portion 72 is a center pattern mirror 88. Mounted to the front wall portion 30 in a direction off-set to a vertical plane by 3° is a center top pattern mirror 94, a right top pattern mirror 96 orientated 49° to the mirror 94 and a left top pattern mirror 98 orientated 49° to the mirror 94. As shown in FIG. 3, the mirrors 84–92 inclusive are orientated at an angle with respect to the floor portion 72. These mirrors act together with the mirrors 94–96 inclusive to direct the scanning light beams received from the pattern mirrors 76–82 inclusive through the aperture 24 (FIG. 1) to form a scan pattern generally indicated by the numeral 89 (FIG. 5) which consists of ten sets of scan lines 99 for scanning the UPC label positioned adjacent the aperture 24. Each set of scan lines is generated by a facet 74 (FIGS. 3 and 4) orientated at 8° to a vertical plane and one of the facets 74 orientated at either plus or minus 3°. The following table discloses the mirrors which generate the scan lines of the scan pattern 89 (FIG. 5).

TABLE

| Scan Lines | Mirrors | Facet Angle |
| --- | --- | --- |
| A | 82 and 94 | +8° |
| B | 76 and 94 | −3° |
| C-L | 80 and 88 | +8° |
| C-R | 78 and 88 | +8° |
| D-L | 82 and 96 | +8° |
| D-R | 82 and 98 | +8° |
| E-L | 78 and 90 | +3° |
| E-R | 80 and 86 | +3° |
| F-L | 80 and 84 | −3° |
| F-R | 78 and 92 | −3° |

Located in the sidewall portion 28 (FIG. 2) of the enclosure structure 20 is a colored meniscus lens member 100 in which is positioned the photodetector 102 for converting the light beams received from the lens member 100 into electrical signals which are processed by the scanner electronics in a manner that is well known in the art. The color of the lens 100 is chosen to filter out wavelengths of light reflected from the UPC label which are less than that of the laser light beam, such as the blue and the green light band, resulting in the transmission of light beams to the photodetector 102 having a band pass centered on the wavelength of the laser light beam as will be described hereinafter. The collection mirror 52 is a spectrally selective "cold" mirror which reflects light having a wavelength equal to or less than that of the laser light beam outputted by the laser member 42. Side 53 of the mirror 52 is painted with a light absorbing material such as black aluminum which absorbs light having a wavelength greater than that of the laser light beam, such as the infrared band, while reflecting the remaining bands of reflected light.

Figure 4:
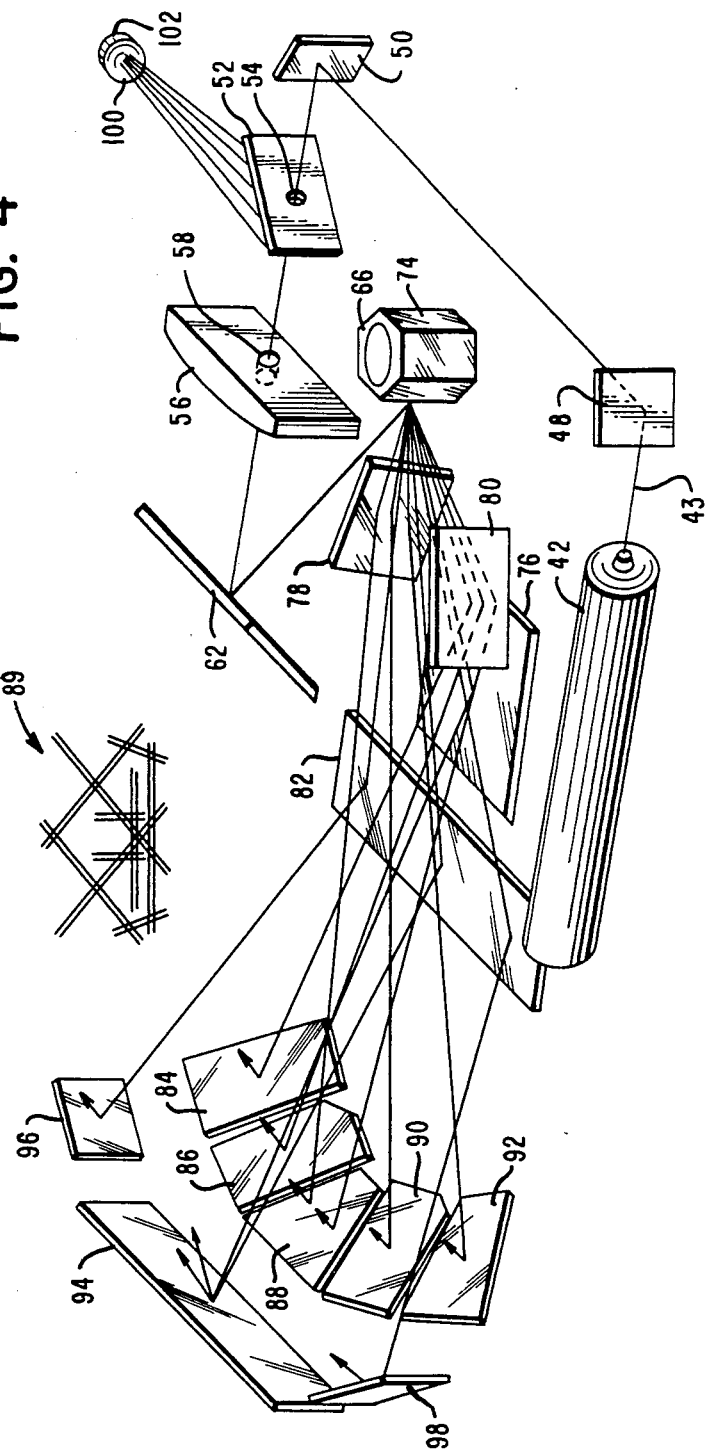
FIG. 4 is a perspective view of the optical geometry of the compact scanner of the present invention.

Referring to FIG. 4, there is shown a perspective view of the optical elements found in the enclosure structure 20 for directing the output light beam 94 of the laser member 42 in a direction to generate the scan pattern 89 (FIG. 5). The laser light beam 94 outputted from the laser tube 42 is routed via the routing mirrors 48 and 50 and through the aperture 54 in the collection mirror 52 to the lenslet portion 58 of the bifocal lens 56. The lenslet portion 58 will direct the light beam 94 at the mirror 62 which reflects the light beam at the rotating mirrored spinner 64. The light beam, upon striking the various facets 74 of the spinner 64, will be directed to the pattern mirrors 76–82 inclusive as set out in the table. The mirrors 76–82 inclusive will reflect the received light beams towards the mirrors 84–98 which reflect the beams through the aperture 24 (FIG. 1) in the cover portion 22 of the optical scanner 20. The resulting scan pattern 89 that is generated by this mirror system comprises sets of scan lines 99 which cross, as shown in FIG. 5, to provide a highly efficient scan pattern capable of reading a bar code label orientated up to 90° to the cover portion 22.

After striking the UPC label, the diverging reflected light beams are retro-directed through the aperture 28 to the pattern mirrors 76–98 inclusive and to the spinner 64 which directs the reflected light beams towards the routing mirror 62 from where the light beams are directed to the bifocal lens 56. The lens 56 will focus the received light beams at the photodetector 102 (FIG. 2) by directing the reflected light beam at the collection mirror 52 which reflects the received light beams towards the lens 100 from where the photodetector 102 will generate electrical signals for processing the data incorporated in the bar code label. Since the reflected light beams may contain sunlight, the mirror 52 and the lens 100 filter out all wavelengths of light except that of the laser light thus insuring that the light beams received by the photodetector 102 will enable the photodetector to generate electrical signals which accurately represent the data contained in the bar code label. It will thus be seen that there is disclosed a mirror arrangement in an optical scanner which generates a scan pattern for reading a bar code label comprising diagonal scan lines which are shorter than those in the above-cited patent application Ser. No. 605867, which results in higher projection angles which in turn results in less beam elongation enabling the scanner to read bar code labels which may be orientated flush to the top surface of the scanner.

Although the preferred embodiment of the present invention has been described herein, it is not intended that the invention be restricted thereto but that it be limited only by the true spirit and scope of the appended claims.

What is claimed is:

1. An optical scanning apparatus for reading bar code symbols on objects passing over the scanning apparatus comprising:
   a floor member;
   a cover member having an aperture therein through which scanning light beams are projected and over which a merchandise item bearing a coded label is moved past the aperture;
   oppositely located first and second sidewall members and a front wall member;
   a support member mounted between said first and second sidewall members intermediate said floor and cover members;
   a source of a coherent light beam secured to said first sidewall member adjacent the top surface of said support member;
   first light reflecting means mounted on said support member for receiving said light beam and reflecting the light beam along a first light path;
   second light reflecting means mounted on said support member for receiving the reflected light beam from said first reflecting means for transmitting the light beam along a second light path;
   light transmitting means mounted on said support member for receiving the reflected light beam from said second reflecting means for transmitting the light beam further along said second light path;
   third reflecting means mounted on said support member for reflecting the light beam towards the floor member along a third light path which extends in a direction opposite to that of the second light path;
   scanning means mounted on said support member in said third light path for cyclically sweeping the light beam along a plurality of fourth light paths;
   fourth reflecting means mounted in said fourth light paths and on said floor member for reflecting the light beam along a plurality of fifth light paths;
   fifth reflecting means mounted in said fifth light paths and on said floor member adjacent the front wall member for reflecting the light beams through said aperture in the cover member for scanning a bar code label positioned adjacent said aperture; and
   sixth reflecting means mounted in said fifth light paths and above said floor member adjacent the front wall member of the housing structure and the cover member for reflecting the light beams through said aperture in the cover member for scanning a bar code label positioned adjacent said aperture.

2. The scanning apparatus of claim 1 in which said scanning means includes a multifaceted mirror member positioned between said floor member and said support member adjacent said light transmitting means in which each of the mirror facets is mounted on the mirror member at an angle different from its adjacent facets and drive means mounted on said support member and rotatably supporting said multifaceted mirror member for rotating said multifaceted mirror member whereby said multifaceted mirror member reflects the light beam along said plurality of fourth light paths.

3. The scanning apparatus of claim 2 in which the multifaceted mirror member comprises three sets of oppositely mounted mirror facets with each set of mirror facets mounted to the mirror member at an angle to a common axis different from its adjacent mirror facets for cyclically sweeping the beam along six separate fourth light paths towards said fourth reflecting means.

4. The scanning apparatus of claim 3 in which said fourth reflecting means includes first and second mirror members mounted adjacent said rotating multifaceted mirror member substantially parallel to the surface of the floor member in which the first mirror member receives a light beam reflected from a mirror facet mounted to the rotating mirror member at a first angle and said second mirror member receives a light beam reflected from a mirror facet mounted to the rotating mirror member at a second angle.

5. The scanning apparatus of claim 4 in which said fifth reflecting means comprises a plurality of third reflecting mirror members mounted in an arcuate pattern at an acute angle to the floor member adjacent said front wall member of the housing structure for reflecting the light beams through said aperture.

6. The scanning apparatus of claim 5 in which said sixth reflecting means comprises a plurality of fourth reflecting mirror members mounted to said front wall member above said floor member, said fourth reflecting mirror members orientated in a direction substantially perpendicular to the floor member.

7. A portable optical scanning apparatus for reading bar code labels on merchandise items passing over the scanning apparatus comprising:
- a housing structure which includes front and rear wall members;
- a floor member and a cover member having an aperture therein through which scanning light beams are projected and over which a merchandise item bearing a coded label is moved past the aperture;
- oppositely located first and second sidewall members;
- a shelf member mounted between said sidewall members, said intermediate floor member and said cover member, said shelf member extending out from said rear wall member a predetermined distance forming an opening within the housing structure and including a recessed portion;
- a source for a coherent light beam secured to said first sidewall member adjacent a the top surface of said shelf member;
- a first mirror member mounted on said shelf member for receiving said coherent light beam from said source and reflecting said coherent light beam along a first light path;
- a second mirror member mounted on said shelf member for receiving the reflected light beam from said first mirror member for reflecting the light beam along a second light path;
- light transmitting means mounted on said shelf member for receiving the reflected light beam from said second mirror member for transmitting the light beam further along said second light path;
- a third mirror member mounted on said shelf member at an angle to said second light path for deflecting the light beam in a downward direction through said recessed portion along a third light path which extends in a direction opposite to that of the second light path;
- a rotatably mounted spinner member having a plurality of sets of oppositely mounted fourth mirror members mounted in said third light path between the shelf member and the floor member for cyclically sweeping the received coherent light beam along a plurality of fourth light paths in a direction toward said front wall member, each of said sets of fourth mirror members mounted on the spinning member at an angle to a common vertical axis which is different from its adjacent set of fourth mirror members for reflecting light beams along one of said fourth paths which is offset in a vertical direction to the fourth paths of light reflected from its adjacent set of fourth mirror members;
- means mounted on said shelf member for rotating said spinner member;
- a plurality of fifth mirror members mounted adjacent to and downstream from said spinner member in said fourth light paths for reflecting light beams along a plurality of fifth light paths;
- a plurality of sixth mirror members mounted at an angle to said floor member adjacent the front wall member and the cover member in said fifth light paths for reflecting light beams in a scan pattern through said aperture including a plurality of sets of first scan lines offset to each other; and
- a seventh mirror member mounted to said front wall member above the floor member in two of said fifth light paths for reflecting light beams in a scan pattern through said aperture including two sets of substantially parallel spaced apart second scan lines for scanning a bar code label positioned adjacent said aperture.

8. The scanning apparatus of claim 7 which further includes a plurality of eight mirror members mounted above the floor members to said front wall member at an angle to said seventh mirror member and in said fifth light paths for projecting the light beams in a scan pattern through said aperture including two sets of third scan lines orientated at an acute angle to each other and at an obtuse angle to said second scan lines.

9. The scanning apparatus of claim 8 in which two of said fifth mirror members are positioned directly downstream of said spinner member and substantially parallel to the surface of the floor member and one of said sixth mirror members is positioned directly downstream of said two of said fifth mirror members and in said fifth light paths for reflecting a light beam in a scan pattern through said aperture including two sets of parallel fourth scan lines orientated in a direction perpendicular to said second scan lines.

10. The scanning apparatus of claim 9 in which each set of scan lines comprises two parallel scan lines.

* * * * *

UNITED STATES PATENT AND TRADEMARK OFFICE
CERTIFICATE OF CORRECTION

PATENT NO. : 4,851,667

DATED : July 25, 1989

INVENTOR(S) : Barry M. Mergenthaler et al.

It is certified that error appears in the above-identified patent and that said Letters Patent is hereby corrected as shown below:

Column 7, line 20, delete the word "a".

Column 8, line 27, delete "eight" and substitute --eighth--.

Signed and Sealed this

Twenty-second Day of May, 1990

Attest:

HARRY F. MANBECK, JR.

Attesting Officer

Commissioner of Patents and Trademarks